March 30, 1937.　　E. L. PFLANZ　　2,075,300
FILTER
Filed Jan. 25, 1934　　2 Sheets-Sheet 1

Inventor:
Ernst L. Pflanz
By Williams, Bradbury, McCaleb & Hinkle
Attys.

March 30, 1937. E. L. PFLANZ 2,075,300
FILTER
Filed Jan. 25, 1934 2 Sheets-Sheet 2
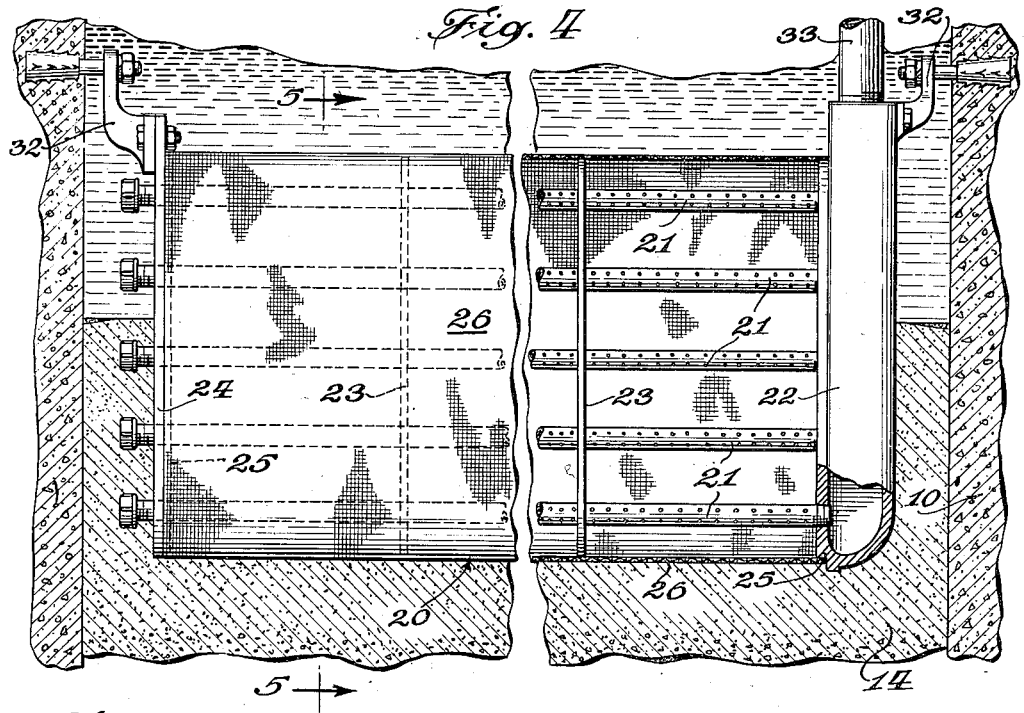
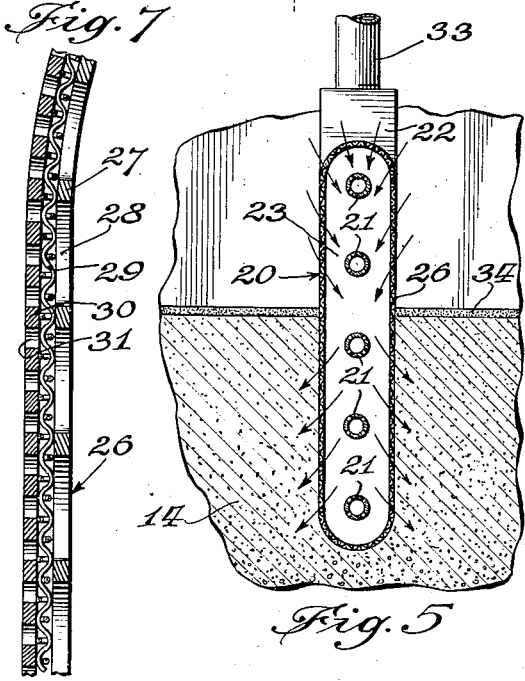
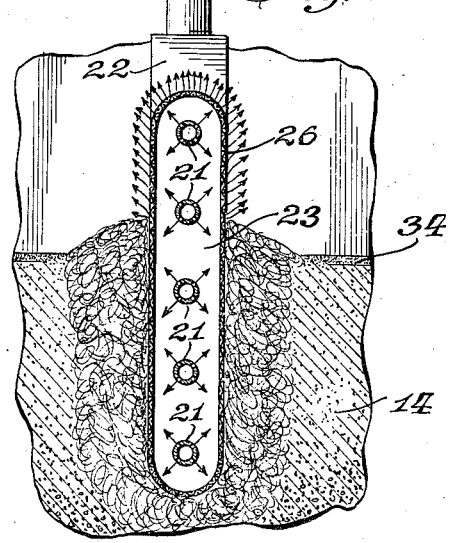
Inventor:
Ernst L. Pflanz
By Williams, Bradbury, McCaleb & Hinkle
Attys.

Patented Mar. 30, 1937

2,075,300

UNITED STATES PATENT OFFICE 2,075,300

FILTER

Ernst L. Pflanz, Glencoe, Ill.

Application January 25, 1934, Serial No. 708,179

10 Claims. (Cl. 210—130)

This invention relates to filters and particularly to sand filters suitable for use in the preparation of water for drinking purposes.

Such filters normally comprise a filter basin in which a bed of sand is supported on a layer of graded gravel. The water to be filtered is supplied above the sand bed and is withdrawn by suitable perforated pipes located in the gravel bed.

When the filter becomes fouled it must be washed and this washing is normally effected by introducing water under pressure by the outlet pipes which water ascends upwardly through the sand bed converting it into an ebulliting mass of quicksand. The rapid movements of the sand particles and their collisions have the effect of removing dirt from the particles and the dirt is carried away by the wash water.

One effect of such washings is to subject the sand bed to repeated hydraulic gradation and the inevitable distribution of the finest particles of sand at or near the top surface. The result of this location of the finest sand is that the top surface has a very effective filtering or straining action and the filter becomes choked by a superficial skin of dirt, the "schmutzdecke" at a time when the filtering ability of the main body of sand is only slightly, if at all, impaired.

Efforts have been made to remove the finest sand with the expectation of avoiding excessive filtering at the surface. Such efforts have been without success because fine sand is produced by attrition during washing and only a very small quantity is necessary to fill in the interstices between sand particles of normal size with the same excessive filtration at the surface.

One of the objects of the invention is to provide an improved sand filter.

A further object of the invention is to provide means for substantially increasing the area of effective filtering surface of a sand filter.

A further object of the invention is to provide a sand filter in which a substantial part of the surface is free from excessively fine sand.

A further object of the invention is to provide a method of filtering in which fine sand is removed from a major filtering surface by hydraulic gradation.

A further object of the invention is to provide a filter which can be readily subjected to secondary cleansing in order to restore it to high efficiency after it has become superficially choked.

Other objects, advantages and capabilities of the invention will appear from the following description of a preferred embodiment thereof, taken in conjunction with the accompanying drawings, in which Figure 1 is a plan view of a series of filters embodying my invention;

Fig. 4 is a fragmentary sectional detail view showing the improved channeler on a larger scale and partly in section;

Fig. 5 is a sectional detail view taken on the line 5—5 of Fig. 4;

Fig. 6 is a sectional detail view similar to Fig. 5 illustrating the secondary washing operation, and Fig. 7 is a sectional detail view showing one form of channeler wall.

Figure 1:
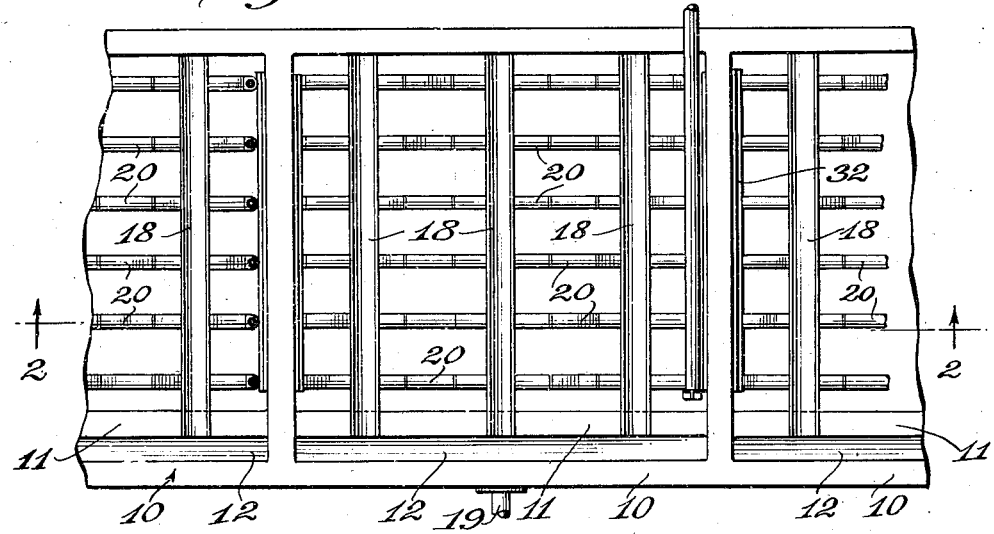

Referring to the drawings, the reference numeral 10 designates the filter basin which may suitably be of concrete. Adjacent one side the basin is provided with a wall 11 which extends from the bottom of the basin upwardly to a height substantially below that of the side walls of the basin. The wall 11 forms with the adjacent wall of the basin a channel 12 for filter wash water. The channel 12 is drained by a pipe 13 provided with a suitable valve (not shown). Between the wall 11 and the opposite wall of the basin is located the filter bed 14 of sand which is supported by a bed of gravel 15, the size of which is graduated, the larger sizes being located at the bottom. At the bottom are located perforated draw-off pipes 16 which connect to manifolds 17 which convey the filtered water away to suitable storage basins (not shown).

Above the sand bed 14 are placed horizontal overflow troughs 18 which are supported between the wall 11 and the opposite wall of the filter basin. These troughs are adapted to receive wash water when the filter is being washed and convey it into the channel 12.

Figure 3:
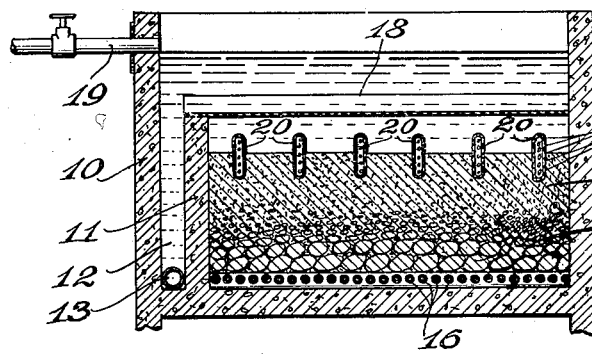
Fig. 3 is a sectional elevation taken on the line 3—3 of Fig. 2.

The water to be filtered is supplied by the feed pipe 19 which is adapted to fill the basin in the manner indicated in Fig. 3. It will be understood that during filtering the valve in the pipe 13 is closed and that the water passes through the sand bed 14, gravel bed 15 and perforated pipes 16 into the manifold 17.

I provide in each filter basin 10, a suitable number of channelers 20 which will now be described. The channelers 20 are chambers formed of perforated or foraminous material. They are suitably of long, flat shape, preferably extending across the filter basin as shown in the drawings. Each channeler is provided interiorly with a series of perforated pipes 21 which communicate with a header 22 at one end of the channeler. The pipes 21 are supported in spaced relation by plates 23 through which the pipes pass. At the end of the channeler remote from the header 22 is provided an end plate 24. The header 22 and plate 24 are provided on their inner sides with shoulders 25 which correspond in shape to the plates 23 and align therewith. The plates 23 and the shoulders 25 provide support for the perforated wall 26 of the channeler.

The wall 26 may suitably be formed of wire gauze of sufficient fineness to prevent the entry of sand particles of normal size. Instead of gauze I may employ sheet metal provided with perforations of suitable size. As shown in Fig. 7, I may employ a wall comprising an inner supporting plate 27 having large perforations 28. Upon this plate I place a sheet of wire gauze 29 and upon this sheet I superpose a metal plate 30 having small perforations 31, adapted to cooperate with the gauze 29 to keep the sand particles of normal size out of the channeler.

As shown in the drawings, the channelers 20 are placed with their transverse directions vertical and their longitudinal directions horizontal. They are secured to the walls of the basin by brackets 32 mounted upon the basin walls at a height which locates the greater part of the channelers embedded within the sand bed 14. The upper parts of the channelers are submerged in the superambient layer of water during normal operation and such water is free to enter into the channelers through their perforated walls. The headers 22 are supplied with wash water by means of pipes 33.

The operating cycle of the filter is as follows: Assuming that the filter has been used considerably and requires to be cleaned, the valve in the pipe 13 is opened and clean filtered water is supplied under pressure to the manifolds 17. This water rises through the sand bed 14 and expands it in the manner of quicksand. The active movements of the sand particles and their collisions effectively free them from adhering dirt which is carried by the wash water upwardly into the troughs 18. The dirty wash water escapes through channel 12 and pipe 13. When the wash water runs clear it is discontinued and the sand is allowed to settle into the compact bed 14.

As explained above, this settlement is accompanied by hydraulic gradation, the very finest sand particles being located in the topmost skin of the filter bed, as indicated at 34 in Figs. 5 and 6. It is to be noted however that the sand in contact with the walls 26 of the channelers 20, except the small area in contact with the topmost skin 34, is of the optimum size for filtering and is substantially free from the finest sand particles.

Figure 2:
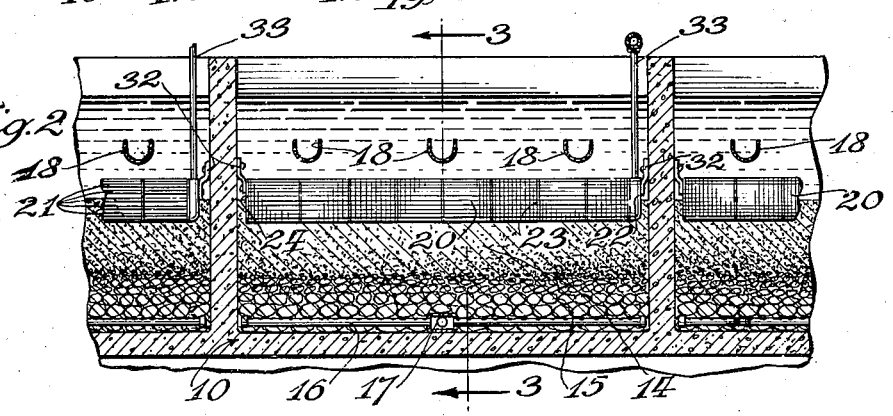
Fig. 2 is a sectional elevation taken on the line 2—2 of Fig. 1.

Water is supplied by feed pipe 19 and the basin is filled, as shown in Figs. 2 and 3. The water passes through the layer of fine sand 34 through the body of the sand bed 14, the dirt collecting over the surface in the usual manner to form the "schmutzdecke". Water also passes freely into the channelers 26 through the perforated wall 26 and passes freely therefrom into the sand bed 14. Owing to the absence of the finest sand around the embedded portions of the channelers, the filtering action is not so localized as in the case of the top layer 34. Particles of dirt are able on the average, to penetrate more deeply into the sand so that this portion of the filtering surface is effective for a much longer time.

When the filter slows down to an excessive degree, I supply water by the pipes 33 to the pipes 21 within the channelers. This water need not be filtered water but may be part of the feed supply. This water passes outwardly through the perforated walls 26 of the channelers and sets up a thorough agitation, or quicksand condition, around them, as illustrated in Fig. 6.

This action breaks the "schmutzdecke" of the surface 34 adjacent the channelers 20, and the dirt retained by the sand around the embedded surface of the channelers is loosened and washed out from a large volume of sand, being the sand in which turbulent motion is shown in Fig. 6. The filtering rate of the filter is thereby restored, and this rate may in some cases be better and more sustained than that of the first run after general washing of the filter. This fact I attribute to the fact that the finest sand of the top layer 34 becomes bound with the "schmutzdecke" and is carried over the "schmutzdecke" and into the center of the spaces between the channelers, and with coarser and cleansed sand around the embedded surface of the channelers, the water is permitted to penetrate further into the sand bed and reach sand whose filtering efficiency has not as yet been impaired. This secondary washing can be repeated several times with diminishing results until it is necessary to subject the filter to a general wash in the manner first described.

It will readily be understood that the provision of the channelers provides a substantially increased filter surface. In the embodiment of the invention shown, the filter surface is approximately doubled by the installation of the channelers. It will be obvious that even greater increase of area may be obtained, if desired, by increasing the depth and number of the channelers employed. Not only is the area of filtering surface increased but the new area provided by the introduction of channelers is more efficient and enduring and the resulting increase of filtering capacity of the filter which results from the provision of channelers, is much greater than the increase of filtering surface.

Although the invention has been described in connection with the specific details of a preferred embodiment, it must be understood that such details are not intended to be limitative of the invention except in so far as set forth in the accompanying claims.

I claim:

1. A sand filter comprising a sand bed, and a substantially horizontal conduit element extending above the sand bed and extending substantially into the sand bed below the level of the superficial fine sand, said element having perforations above the sand bed and below said level.

2. A sand filter comprising a sand bed, a deep conduit element extending into and above the sand bed and having numerous perforations above and below the sand surface level, and means within the conduit for supplying water for washing the interior of said element.

3. A sand filter comprising a sand bed, and a channeler extending into and above the sand bed, said sand bed having its finest particles on the upper surface and the sand in contact with the embedded part of the channeler being substantially free from the finest particles, said channeler being provided with numerous perforations above and below the location of the fine sand.

4. A sand filter comprising a sand bed, a channeler extending into and above the sand bed, said sand bed having its finest particles on the upper surface and the sand in contact with the embedded part of the channeler being substantially free from the finest particles, and perforated pipes within the channeler adapted to supply water to the interior thereof, said channeler being provided with numerous perforations above and below the location of the fine sand.

5. A sand filter comprising a filter basin, a sand-bed therein, a plurality of elongated channelers of generally flat shape and of perforated material partly above the sand-bed and extending a substantial distance into the sand bed, means supporting the channelers on the basin, and means extending through the interiors of said channelers for supplying washing water thereto.

6. The method of filtering water which consists in placing a chamber having perforated walls partly within and partly above a sand-bed, said chamber having openings above the sand level and being provided with numerous perforations substantially below the sand level, thereby creating artificial confined sand surfaces below the level of the sand, which artificial sand surfaces are in free communication with the interior of said chamber through the perforations in the walls of said chamber, subjecting the sand-bed to agitation with water and allowing it to settle thereby bringing the finest particles to the natural surface of the sand and reforming the artificial confined surfaces adjacent the perforated chamber with the major part thereof substantially free of said finest particles, and supplying water to be filtered to the interior of said chamber.

7. The method of filtering water which consists in placing a chamber having perforated walls partly within and partly above a sand-bed, said chamber having openings above the sand level and being provided with numerous perforations substantially below the sand level, thereby creating artificial confined sand surfaces below the level of the sand, which artificial sand surfaces are in free communication with the interior of said chamber through the perforations in the walls of said chamber, subjecting the sand-bed to agitation with water and allowing it to settle thereby bringing the finest particles to the natural surface of the sand and reforming the artificial confined surfaces adjacent the perforated chamber with the major part thereof substantially free of said finest particles, and supplying water to the interior of the perforated chamber through its perforations above the natural sand level, and thereby to the artificial confined surfaces of the sand.

8. The method of filtering water which consists in placing a chamber having perforated walls partly within and partly above a sand-bed, said chamber having openings above the sand level and being provided with numerous perforations substantially below the sand level, thereby creating artificial confined sand surfaces below the level of the sand, which artificial sand surfaces are in free communication with the interior of said chamber through the perforations in the walls of said chamber, subjecting the sand-bed to agitation with water and allowing it to settle thereby bringing the finest particles to the natural surface of the sand and reforming the artificial confined surfaces adjacent the perforated chamber with the major part thereof substantially free of said finest particles, supplying water to the interior of the perforated chamber through its perforations above the natural sand level, and thereby to the artificial confined surfaces of the sand, and when the filter slows down agitating the sand around the artificial confined surfaces to restore the filtering capacity of the filter.

9. The method of filtering water which consists in placing a chamber having perforated walls partly within and partly above a sand-bed, said chamber having openings above the sand level and being provided with numerous perforations substantially below the sand level, thereby creating artificial confined sand surfaces below the level of the sand, which artificial sand surfaces are in free communication with the interior of said chamber through the perforations in the walls of said chamber, subjecting the sand-bed to agitation with water and allowing it to settle thereby bringing the finest particles to the natural surface of the sand and reforming the artificial confined surfaces adjacent the perforated chamber with the major part thereof substantially free of said finest particles, supplying water to the interior of the perforated chamber through its perforations above the natural sand level, and thereby to the artificial confined surfaces of the sand, and when the filter slows down supplying water under pressure from jets to the interior of the chamber thereby agitating and washing the sand at and around said confined surfaces and restoring the capacity of the filter.

10. The method of filtering water which consists in placing a chamber having perforated walls partly within and partly above a sand-bed, said chamber having openings above the sand level and being provided with numerous perforations substantially below the sand level, thereby creating artificial confined sand surfaces below the level of the sand, which artificial sand surfaces are in free communication with the interior of said chamber through the perforations in the walls of said chamber, subjecting the sand-bed to agitation with water and allowing it to settle thereby bringing the finest particles to the natural surface of the sand and reforming the artificial confined surfaces adjacent the perforated chamber with the major part thereof substantially free of said finest particles, supplying water to the interior of the perforated chamber through its perforations above the natural sand level, and thereby to the artificial confined surfaces of the sand, repeatedly agitating the sand around the artificial confined surfaces to restore the filtering capacity of the filter when the filter slows down, and finally washing the whole sand-bed.

ERNST L. PFLANZ.